United States Patent
Lee et al.

(10) Patent No.: US 9,332,228 B2
(45) Date of Patent: May 3, 2016

(54) CONTENT PROVISION APPARATUS AND METHOD

(75) Inventors: Sang-Kwon Lee, Suwon-si (KR); Hyok-Sung Choi, Seoul (KR); Seong-Kook Shin, Seoul (KR); Se-Jun Han, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 816 days.

(21) Appl. No.: 12/532,025

(22) PCT Filed: Mar. 18, 2008

(86) PCT No.: PCT/KR2008/001524
§ 371 (c)(1),
(2), (4) Date: Sep. 18, 2009

(87) PCT Pub. No.: WO2008/114994
PCT Pub. Date: Sep. 25, 2008

(65) Prior Publication Data
US 2010/0107190 A1    Apr. 29, 2010

(30) Foreign Application Priority Data

Mar. 19, 2007  (KR) .................. 10-2007-0026716
Feb. 4, 2008  (KR) .................. 10-2008-0011242

(51) Int. Cl.
*H04N 21/435* (2011.01)
*H04N 21/235* (2011.01)
*H04N 7/173* (2011.01)
(Continued)

(52) U.S. Cl.
CPC ..... *H04N 7/17318* (2013.01); *H04N 21/25808* (2013.01); *H04N 21/25891* (2013.01); *H04N 21/44016* (2013.01); *H04N 21/6581* (2013.01); *H04N 21/812* (2013.01)

(58) Field of Classification Search
CPC ............................. H04N 7/173; H04H 60/375
USPC ......................................... 725/32, 40, 43, 86
See application file for complete search history.

(56) References Cited

U.S. PATENT DOCUMENTS 7,620,965 B2    11/2009  Miyazaki
7,792,325 B2 *  9/2010   Rhoads et al. ................ 382/100
(Continued)

FOREIGN PATENT DOCUMENTS

CN    1317201 A    10/2001
CN    1359591 A    7/2002
(Continued)

OTHER PUBLICATIONS

Communication, Dated Jul. 2, 2014, Issued by the State Intellectual Property Office, In counterpart Chinese Application No. 200880009194.4.
(Continued)

*Primary Examiner* — Kieu Oanh T Bui
(74) *Attorney, Agent, or Firm* — Sughrue Mion, PLLC

(57) ABSTRACT

Provided are a content provision apparatus and method. The content provision apparatus includes a message reception module receiving a service request message from a display apparatus which displays first content; a content extraction module analyzing the received service request message and extracting second content associated with the first content; and a communication module transmitting the extracted second content.

43 Claims, 6 Drawing Sheets

(51) Int. Cl.
  *H04N 21/258* (2011.01)
  *H04N 21/44* (2011.01)
  *H04N 21/658* (2011.01)
  *H04N 21/81* (2011.01)

(56) References Cited

U.S. PATENT DOCUMENTS

| | | | |
|---|---|---|---|
| 7,941,818 | B2 | 5/2011 | Ward, III et al. |
| 7,984,473 | B1 * | 7/2011 | Casile et al. ............ 725/116 |
| 8,555,318 | B2 * | 10/2013 | Whitehead ............. 725/46 |
| 2002/0046401 | A1 | 4/2002 | Miyazaki et al. |
| 2004/0268419 | A1 | 12/2004 | Danker et al. |
| 2006/0090185 | A1 | 4/2006 | Zito et al. |
| 2006/0143658 | A1 | 6/2006 | Stone |
| 2007/0220558 | A1 * | 9/2007 | Jung et al. ............... 725/62 |
| 2007/0300280 | A1 * | 12/2007 | Turner et al. ............ 725/135 |
| 2008/0071929 | A1 * | 3/2008 | Motte et al. ............. 709/246 |
| 2008/0077958 | A1 | 3/2008 | Ward, III et al. |
| 2014/0250463 | A1 * | 9/2014 | Barton et al. ............ 725/42 |

FOREIGN PATENT DOCUMENTS

| | | | |
|---|---|---|---|
| CN | 1574959 | A | 2/2005 |
| EP | 1 492 349 | A2 | 12/2004 |
| EP | 1492349 | A2 | 12/2004 |
| JP | 2002-44637 | A | 2/2002 |
| KR | 10-2000-0012639 | A | 3/2000 |
| KR | 10-2001-0086675 | A | 9/2001 |
| KR | 10-2002-0029046 | A | 4/2002 |
| WO | 97/11561 | A | 3/1997 |
| WO | 0002380 | A2 | 1/2000 |
| WO | 00/08855 | A1 | 2/2000 |
| WO | 01/01678 | A1 | 1/2001 |
| WO | 2006078088 | A1 | 7/2006 |

OTHER PUBLICATIONS

Communication, dated Dec. 9, 2013, issued by the Korean Intellectual Property Office in counterpart Korean Patent Application No. 10-2008-0011242.

Extended European search report dated Jul. 13, 2011 in corresponding European patent application No. 08723561.0.

First Office Action issued Aug. 4, 2010 in counterpart Chinese Application No. 200880009194.4.

* cited by examiner

CONTENT PROVISION APPARATUS AND METHOD

CROSS-REFERENCE TO RELATED APPLICATIONS

This application is a National Stage of International Application No. PCT/KR2008/001524, filed Mar. 18, 2008, and claims priority from Korean Patent Application No. 10-2007-0026716, filed on Mar. 19, 2007, and Korean Patent Application No. 10-2008-0011242, filed on Feb. 4, 2008, in the Korean Intellectual Property Office, the disclosures of which are incorporated herein in their entireties by reference.

BACKGROUND

1. Field

Apparatuses and methods consistent with the exemplary embodiments of the present invention relate to a content provision apparatus and method, and more particularly, to a content provision apparatus and method, in which advertisement content corresponding to broadcast content that is displayed on a display apparatus is searched for by using a keyword or an electronic program guide (EPG), the advertisement content corresponding to the broadcast content is registered, and information indicating the existence of the advertisement content is provided in a predetermined region of the display apparatus which is connected by a predetermined communication network.

2. Description of Related Art

A user of a display apparatus searches for advertisement content corresponding to broadcast content by using a keyword or an electronic program guide (EPG), receives the found advertisement content, and the advertisement content and information are displayed on the display apparatus, indicating the existence of the advertisement content.

Digital broadcasting refers to a broadcast method that converts image, audio, and data signals into digital signals and transmits the digital signals. As broadcasting becomes digital, the broadcasting industry is being used as a more important medium of informatization. In addition, with the popularization of digital televisions (TVs), digital TVs will serve as an information platform for users in the multimedia age. Since digital broadcast content can be utilized as a source of multimedia content, various digital multimedia content, such as games, animations, electronic publishing and Internet and image content, is expected to form the core of the high value-added industry of the $21^{st}$ century. Ultimately, broadcast content will secure its position as a core element of various multimedia content.

Digital broadcasting services may be divided into digital terrestrial TV broadcasting, digital cable broadcasting, digital satellite broadcasting, terrestrial digital audio broadcasting, and the like. However, new forms of broadcast services, which converge broadcasting and communication, are also being provided, such as Internet broadcasting, video on demand (VOD), data broadcasting, and digital multimedia broadcasting (DMB). Furthermore, broadcasting networks are being used for communication services or services similar to communication. Examples of such services include an Internet protocol (IP)-TV service, which enables users to receive broadcast programs through the Internet and watch the broadcast programs on TV, and a mobile broadcast service which provides broadcast programs on mobile phones using a mobile communication network.

Considering that advertisers desire to increase advertising effects and that maximum advertising effects can be achieved through mass media widely, closely and directly connected to targets of advertisements, advertising methods using various industrial environments of digital broadcasting will generate very powerful advertising effects.

According to a conventional advertising method using digital broadcasting or Internet broadcasting, advertising broadcasts are provided before, after, or during a main broadcast. In another conventional advertising method, types of broadcasts selected by viewers are classified, and statistics on the types of the selected broadcasts are gathered in order to analyze preferences of the viewers. Then, advertising broadcasts are provided according to the analyzed preferences of the viewers. Another conventional advertising method uses various screen distribution methods that can be implemented in digital TV and Internet broadcasting.

Korean Patent Publication No. 2001-0016057, entitled "Advertising System and Method Using Electronic Display Panel," discloses an advertising method using an electronic display panel. In this advertising method, an electronic display panel is divided into a plurality of cells, and a banner or moving-image advertisement is provided for a predetermined period of time at a cell located at a position desired by a customer while the customer is watching a broadcast. According to the advertising method, an advertiser can directly register advertisements. However, since the advertisements are irrelevant to a broadcast that a user is currently watching, the advertisements may hinder the user in watching the broadcast.

Korean Patent Publication No. 2005-0111830, entitled "Advertising Method Using Association Technique in Digital Broadcasting," provides a method of assigning a unique code to each scene of a broadcast program, assigning a corresponding code to an advertisement directly related to each scene, and transmitting the advertisements having the corresponding codes when the broadcast program is provided. According to the advertising method, advertisements related to a broadcast program can be provided. However, the advertisements can be provided only when a user is watching the broadcast program. In addition, assigning codes to broadcasts and advertisements may create problems in terms of economy and time.

SUMMARY one or more embodiments provide provide a content provision apparatus and method, in which second content associated with, e.g., connected with, the first content that is displayed on a display apparatus is registered as such with a content provision apparatus based on a keyword search or an electronic program guide (EPG), a service request message for the second content is received and analyzed, the second content is extracted, and the extracted second content is provided to the display apparatus.

However, aspects of exemplary embodiments of the present invention are not restricted to the one set forth herein. The above and other aspects of exemplary embodiments of the present invention will become more apparent to one of ordinary skill in the art to which the present invention pertains by referencing the detailed description of exemplary embodiments of the present invention given below.

According to an aspect of exemplary embodiments of the present invention, there is provided a content provision apparatus including a message reception module receiving a service request message from a display apparatus which displays first content; a content extraction module analyzing the received service request message and extracting second content associated with the first content; and a communication module transmitting the extracted second content.

According to another aspect of exemplary embodiments of the present invention, there is provided a content provision method including receiving a service request message from a display apparatus which displays first content; analyzing the received service request message and extracting second content associated with the first content; and transmitting the extracted second content.

BRIEF DESCRIPTION OF THE DRAWINGS

The above and other aspects and features of exemplary embodiments of the present invention will become more apparent by describing in detail exemplary embodiments thereof with reference to the attached drawings, in which.

DETAILED DESCRIPTION

Figure 1:
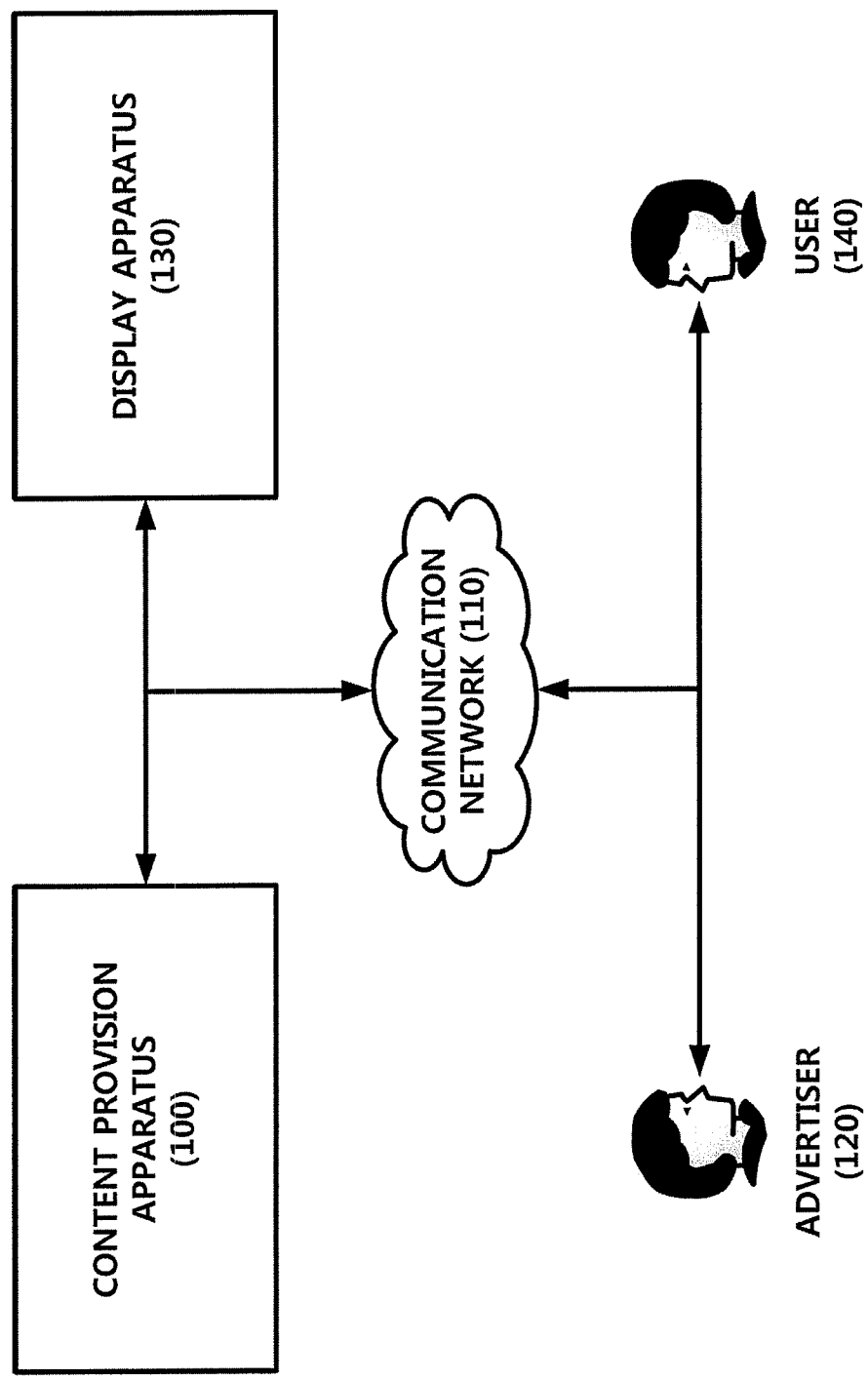
FIG. 1 is a block diagram of a content provision system according to an exemplary embodiment of the present invention.

Advantages and features of exemplary embodiments of the present invention and methods of accomplishing the same may be understood more readily by reference to the following detailed description of exemplary embodiments and the accompanying drawings. Exemplary embodiments of the present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and exemplary embodiments of the present invention will only be defined by the appended claims. Like reference numerals refer to like elements throughout the specification.

FIG. 1 is block diagram of a content provision system according to an exemplary embodiment of the present invention.

The content provision system according to the present exemplary embodiment may include a content provision apparatus 100 and a display apparatus 130.

Referring to FIG. 1, the content provision apparatus 100 and the display apparatus 130 included in the content provision system according to the present exemplary embodiment are connected to each other by a predetermined communication network 110. The present exemplary embodiment will be described based on the assumption that the content provision apparatus 100 and the display apparatus 130 identify each other based on identification information, such as serial numbers and Internet protocol (IP) addresses. However, the present invention is not limited thereto.

The content provision apparatus 100 registers second content associated with the first content which is provided to the display apparatus 130 by a headend (not shown). When receiving a service request message for the second content from the display apparatus 130, the content provision apparatus 100 analyzes the service request message and provides the second content to the display apparatus 130.

In the content provision system, the first content may be broadcast content provided by the headend, and the second content may be advertisement content associated with the first content. However, the first content and the second content according to exemplary embodiments of the present invention are not limited thereto.

The second content may be registered with the content provision apparatus 100 based on an electronic program guide (EPG) including the first content or a keyword search. The registration of the second content based on the EPG is as follows.

The EPG is based on a program and system information protocol (PSIP), and the PSIP includes a total of six tables, that is, a system time table (STT), A master guide table (MGT), a virtual channel table (VCT), a rating region table (RRT), an event information table (EIT), and an extended text table (ETT).

The EIT contains information regarding titles and start times of programs of all channels in the VCT for minimum three hours, and the ETT contains detailed information of each program, such as backgrounds, stories, and characters. The EPG may be periodically provided by the headend or may be obtained from an EPG provision apparatus (not shown) connected to the content provision apparatus 100 by the communication network 110. The EPG including the above information is provided to the content provision apparatus 100 via the communication network 110.

That is, an advertiser 120 selects at least one of a broadcast time, a broadcast channel, a broadcast title and a broadcast genre of desired first content based on the EPG, uploads second content, which is then associated with the first content, to the content provision apparatus 100, and thus registers the second content with the content provision apparatus 100. Here, although not shown in FIG. 1, when registering the second content with the content provision apparatus 100, the advertiser 120 may also register information about a device, which is used to register the second content, such as a serial number and an IP address. Whenever the advertiser 120 registers the second content with the content provision apparatus 100, the content provision apparatus 100 may update second content that is pre-stored therein.

When the second content is registered, a predetermined authentication process may be performed on the advertiser 120 and the second content. In this authentication process, advertiser information of the advertiser 120 and the information about the device, which is used by the advertiser 120 to register the second content, may be authenticated.

Meanwhile, the registration of the second content based on the keyword search is performed as follows. The advertiser 120 may input a keyword (for example, a main character of a drama, a broadcast title, a broadcast time, or the like) pertaining to a first content, to search for second contents corresponding to the input keywords, select a second content from search results for the input keyword to associate the selected second content to the first content, and register the selected second content with the content provision apparatus 100.

That is, the advertiser 120 can register the second content with the content provision apparatus 100 based on the EPG or the keyword search so that the second content associated with the first content, which is displayed on the display apparatus 130, can be displayed on the display apparatus 130 for a user 140 at a desired time or on a desired broadcast channel.

The second content registered with the content provision apparatus 100 is provided to the display apparatus 130 in response to the service request message received from the display apparatus 130.

The service request message received from the display apparatus 130 may include at least one of information about the display apparatus 130, such as the serial number and IP address of the display apparatus 130, user information such as the contact number and address of the user 140, a broadcast channel that broadcasts the first content, and a transmission time of the service request message. In this case, the user 140, who is watching the first content on the display apparatus 130, may transmit the service request message including the above information to the content provision apparatus 100 according to whether the second content associated with the first content exists. In the present exemplary embodiment, a case where the user 140 requests the second content after checking whether the second content associated with the first content exists is described as an example. However, exemplary embodiments of the present invention are not limited thereto. That is, when the user 140 manipulates the display apparatus 130 by providing an input, to, for example, change broadcast channels, the service request message may be automatically transmitted to the content provision apparatus 100, and, accordingly, the user 140 may be provided with the second content.

Before the user 140 transmits the service request message to the content provision apparatus 100 by using the display apparatus 130, the user 140 may input user information, such as the contact number and address of the user 140, to the display apparatus 130. Therefore, when transmitting the service request message to the content provision apparatus 100, the display apparatus 130 may transmit the information about itself and the user information.

If the second content associated with the first content, which is being displayed on the display apparatus 130, exists, information (hereinafter, referred to as second content information) indicating the existence of the second content may be presented in an on-screen display (OSD) format.

The second content information presented in the OSD format indicates whether the second content associated with the first content, which is currently being displayed on the display apparatus 130, exists or indicates the number of pieces of the second content.

Presenting advertisement content information in the OSD format is a mere example, and the second content information may be presented in various ways other than the above example.

While viewing the first content on the display apparatus 130, the user 140 identifies the existence of the second content associated with the first content with reference to the second content information and inputs a control command to the display apparatus 130 using a conventional input module (such as a remote control, not shown) so that a service request message for the second content can be transmitted.

That is, the service request message is transmitted from the display apparatus 130 to the content provision apparatus 100. Then, the content provision apparatus 100 receives the service request message, analyzes the received service request message, extracts the second content, and transmits the extracted second content to the display apparatus 130.

In this case, at least a piece or a list of a plurality of pieces of the second content connected to the first content may be provided to the display apparatus 130 in response to the service request message of the user 140.

A method of displaying the first content and the second content on the display apparatus 130 will be described in detail later with reference to FIG. 4.

As described above, the content provision system according to the present exemplary embodiment registers advertisement content based on a keyword or an EPG corresponding to broadcast content displayed on the display apparatus 130, displays information indicating whether the advertisement content exists on the display apparatus 130, and provides the advertisement content managed by the content provision apparatus 100 to the display apparatus 130.

Alternatively, the content provision system may search for the advertisement content corresponding to the broadcast content displayed on the display apparatus 130 regardless of the displayed information indicating the existence of the advertisement content and receive and display the found advertisement content according to search results.

Figure 2:
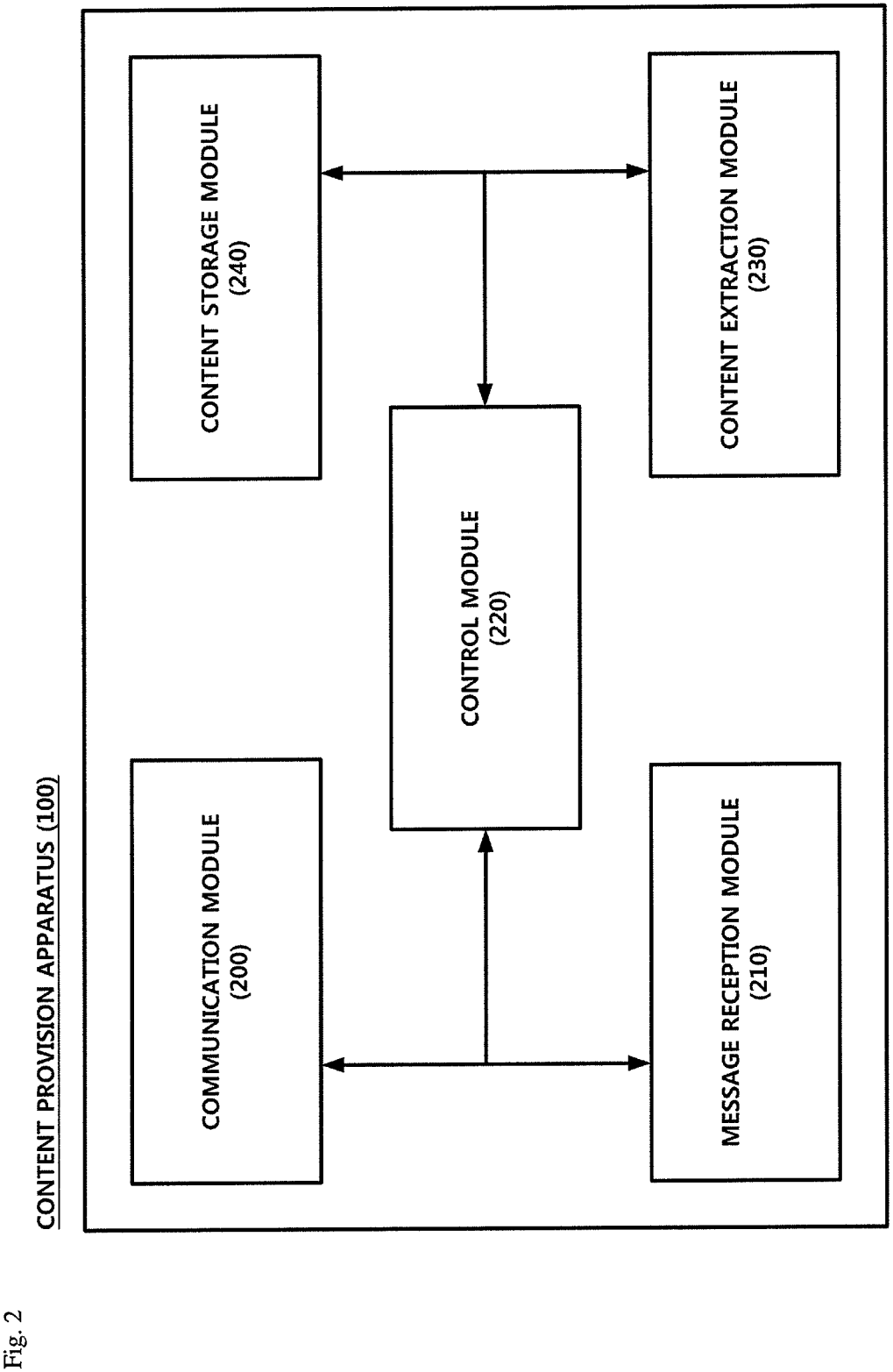
FIG. 2 is a block diagram of a content provision apparatus shown in FIG. 1.

FIG. 2 is a block diagram of the content provision apparatus 100 shown in FIG. 1.

The content provision apparatus 100 registers second content associated with first content which is displayed on the display apparatus 130, analyzes a service request message received from the display apparatus 130, extracts the second content, which is associated with the first content, from the received service request message, and provides the second content to the display apparatus 130.

Referring to FIG. 2, the content provision apparatus 100 includes a message reception module 210, a control module 220, a content extraction module 230, a content storage module 240, and a communication module 200.

First of all, the advertiser 120 generates or registers the second content associated with the first content by using the content provision apparatus 100. In this case, the second content is registered using a method identical or similar to a method of registering content with a web server. That is, second content is uploaded and registered as being associated with the first content based on an EPG provided by a specified apparatus or a keyword search.

Since the registration of the second content based on the EPG or the keyword search has been described above with reference to FIG. 1, a detailed description thereof will be omitted. The second content is uploaded using the communication module 200 or a separate content registration module (not shown) and stored in the content storage module 240. In so doing, the second content is registered as being associated with the first content. In another exemplary embodiment, the communication module 200 may be a communication unit.

The content storage module 240 may store the information about the display device 130 and the user information received from the display apparatus 130. In addition, the content storage module 240 may receive, in advance, the advertiser information of the advertiser 120 and information about a device (for example, a personal computer (PC) of the advertiser 120), which is used by the advertiser 120 to register the second content, and store the received information. In the present exemplary embodiment, a case where the above information is received and stored in advance is described as an example. However, this is merely an example used to promote the understanding of exemplary embodiments of the present invention, and the present invention is not limited thereto. When necessary, the above information may be received in real time and stored in a separate component. The advertiser information and the user information may be used by the user 140 to contact the advertiser 120 after identifying the second content that is provided or may be used by the advertiser 120 to contact the user 140 at the request of the user 140. In another exemplary embodiment, the content storage module 240 may be a content storage unit.

The content storage module 240 stores the second content registered as described above and may further store the serial number, IP address and the like of the display apparatus 130 which are required to identify the display apparatus 130 that requests the second content. However, the exemplary embodiments of present invention are not limited thereto, and the content storage module 240 may further store information required to manage the second content.

In addition, the content storage module 240 may store usage information of the second content, such as the number of times that the second content has been requested or request results, and provide updated information regarding the second content when providing the second content.

The usage information of the second content may be calculated, updated and stored under the control of the control module 220. In another exemplary embodiment, the control module 220 may be a control unit or a controller.

The control module 220 controls all components that can be included in the content provision apparatus 100. The control module 220 conducts a keyword search in order to register the second content and controls an apparatus connected to the content provision apparatus 100 by the communication network 110 to periodically provide an EPG.

In addition, the control module 220 transmits a corresponding control command to the content extraction module 230 in order to instruct the content extraction module 230 to analyze the service request message received from the display apparatus 130 and extract the second content.

The service request message received by the message reception module 210 includes at least one of a serial number of the display apparatus 130, a broadcast channel that broadcasts the first content, and a transmission time of the service request message. The service request message may be transmitted from the display apparatus 130 to the content provision apparatus 100 when the user 140 makes an action such as changing broadcast channels of the display apparatus 130 or when the second content associated with the first content is presented in the OSD format and selected by the user 140. That is, while viewing the first content on the display apparatus 130, if the user 140 changes broadcast channels, the service request message is transmitted from the display apparatus 130 to the content provision apparatus 100, so that the content provision apparatus 100 can extract second content corresponding to first content which is displayed on a new broadcast channel. In another exemplary embodiment, the message reception module 210 may be a message reception unit.

In the service request message which is analyzed by the content extraction module 230, the information about the display apparatus 130 and the user information are used as authentication information for a corresponding service request, together with information stored in the content storage module 240. In another exemplary embodiment, the content extraction module 230 may by a content extraction unit. In addition, the broadcast channel that broadcasts the first content and the transmission time of the service request message are referred to when the second content requested by the display apparatus 130 is extracted.

That is, the content extraction module 230 analyzes the above information included in the service request message and provides information regarding the second content stored in the content storage module 240.

The second content extracted by the content extraction module 230 is associated with the first content displayed on the display apparatus 130 and transmitted to the display apparatus 130 via the communication module 200.

While no service request message is received from the display apparatus 130, that is, according to the reception result of a service request message, the control module 220 controls the communication module 200 to transmit information regarding whether the second content associated with the first content exists. This information may be displayed on the display apparatus 130 in the OSD format as described above with reference to FIG. 1, which will be described in more detail later with reference to FIG. 5.

Figure 3:
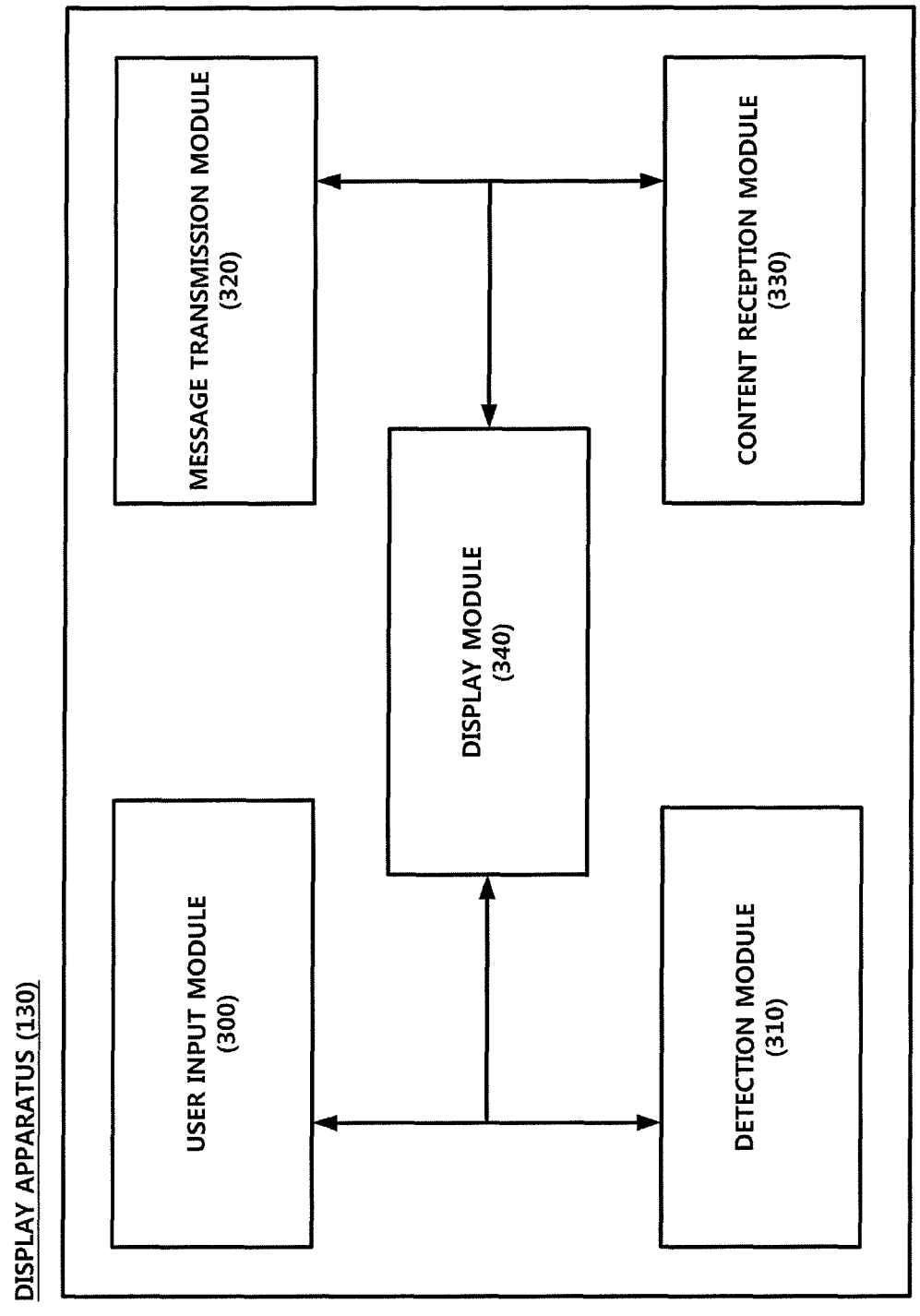
FIG. 3 is a block diagram of the display apparatus 130 shown in FIG. 1.

FIG. 3 is a block diagram of the display apparatus 130 shown in FIG. 1. Referring to FIG. 3, the display apparatus 130 may include a user input module 300, which receives the user information, such as the contact number and address of the user 140, from the user 140, a detection module 310, a message transmission module 320, a content reception module 330, and a display module 340. In another exemplary embodiment, the input module 300, the detection module 310, the message transmission module 320, the content reception module 330, and the display module 340, may respectively be an input unit, a detection unit, a message transmission unit, a content reception unit, and a display unit.

In the present exemplary embodiment, the user input module 300 may include a user interface, which is used by the user 140 to input the user information, such as the contact number and address of the user 140, and a device (such as a remote control or input buttons provided on the display apparatus 130) which is used by the user 140 to input the user information to the user interface. Thus, the user 140 can input the user information using the user input module 300, and the user input module 300 can store the input user information.

The detection module 310 may detect an action made by the user 140, such as changing broadcast channels of the display apparatus 130, or the selection of the second content, which is presented in the OSD format, by the user 140. The message transmission module 320 may transmit the service request message, which includes at least one of the information about the display apparatus 130, the user information, a broadcast channel that broadcast the first content, and the transmission time of the service request message, to the content provision apparatus 100.

Here, the information about the display apparatus 130 and the user information may be included in the service request message and then transmitted to the content provision apparatus 100. Alternatively, the information about the display apparatus 130 and the user information may be transmitted to the content provision apparatus 100 in advance and stored in the content provision apparatus 100.

The content reception module 330 may receive the second content which is provided by the content provision apparatus 100 in response to the service request message transmitted from the message transmission module 320. The display module 340 may display the received second content on the first content in the OSD format.

Figure 4:
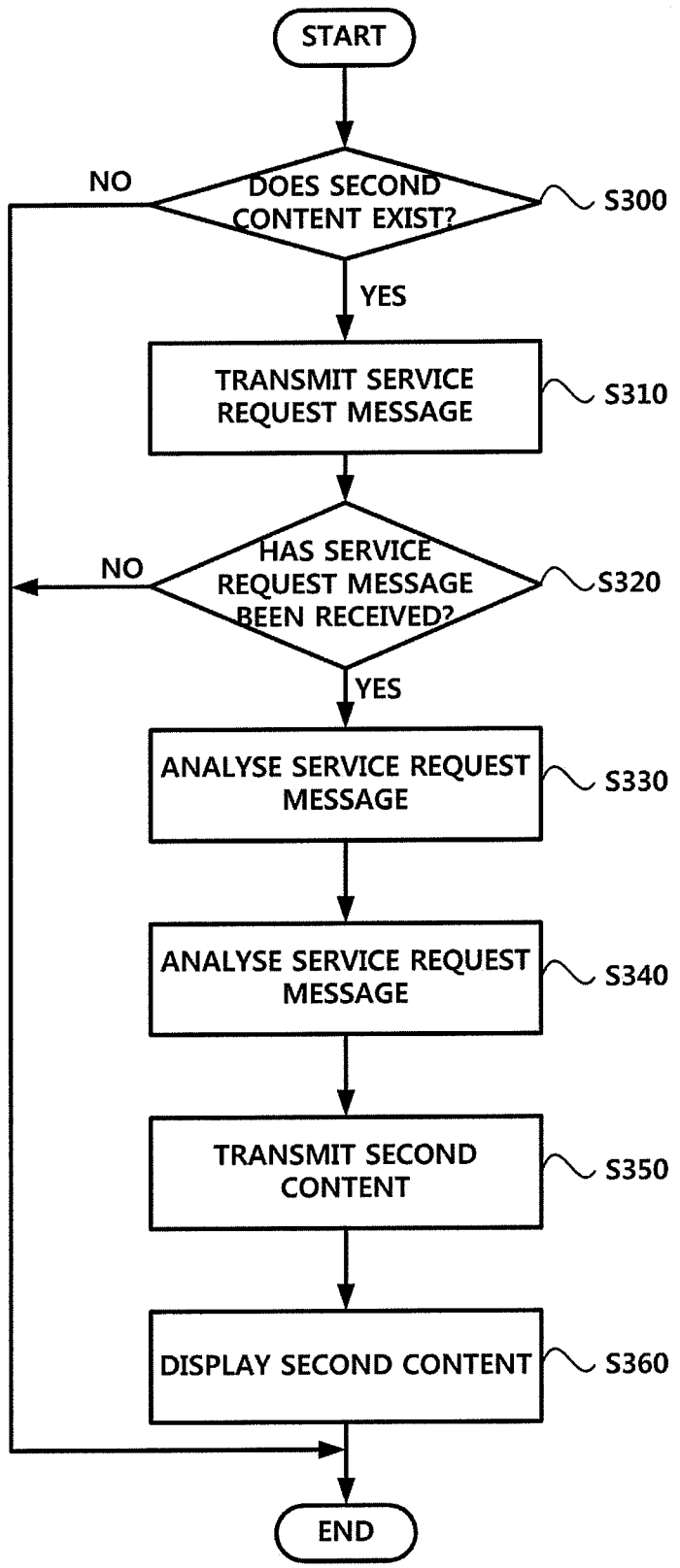
FIG. 4 is a flowchart illustrating a content provision method according to an exemplary embodiment of the present invention.

FIG. 4 is a flowchart illustrating a content provision method according to an exemplary embodiment of the present invention.

In the content provision method according to the present exemplary embodiment, second content associated with first content, which is displayed on the display apparatus 130, is provided in response to a service request message transmitted from the display apparatus 130. The service request message may be transmitted from the display apparatus 130 when the user 140 makes an action such as changing broadcast channels of the display apparatus 130. While a case where the service request message is transmitted when the user 140 changes broadcast channels is described as an example in the present exemplary embodiment, this is merely an example used to promote the understanding of exemplary embodiments of the present invention, and the present invention is not limited thereto. In addition, in the content provision method of FIG. 4, a case where the advertiser 120 and the user 140 transmit advertiser information of the advertiser 120 and user information of the user 140 to the content provision apparatus 100 and where the content provision apparatus 100 stores the advertiser information and the user information will be described as an example.

Referring to FIG. 4, the user 140 determines whether the second content exists in the content provision apparatus 100 based on second content information which is displayed on the display apparatus 130 in the OSD format (operation S300). The second content information may be displayed on the display apparatus 130 in the OSD format in order to inform the user 140 that the content provision apparatus 100 stores the second content which is associated with the first content that the user 140 is viewing.

Based on the determination result of the user 140, the display apparatus 130 transmits a service request message including at least one of the user information of the user, information about the display apparatus 130, a broadcast channel that broadcasts the first content, and a transmission time of the service request message to the content provision apparatus 100 via the communication network 110 (operation S310). In the present exemplary embodiment, a case where the user 140 transmits the service request message by using the display apparatus 130 after identifying the second content presented in the OSD format is described as an example. However, the present invention is not limited thereto. That is, when the user 140 takes an action such as changing broadcast channels of the display apparatus 130, the display apparatus 130 may detect the action and transmit the service request message to the content provision apparatus 100.

If the service request message is received by the message reception module 210 of the content provision apparatus 100, the control module 220 of the content provision apparatus 100 determines whether the service request message has been received (operation S320). Based on the determination result, the control module 220 determines whether to provide second content information indicating whether the second content exists or to provide the second content via the communication module 200.

According to the result of determining whether the service request message has been received, the service request message is transmitted to and then analyzed by the content extraction module 230 (operation S330).

Here, the content extraction module 230 analyzes whether the service request message includes at least one of the serial number of the display apparatus 130, the broadcast channel that broadcasts the first content and the transmission time of the service request message and authenticates the display apparatus 130, which transmitted the service request message, using an authentication module (not shown).

The content extraction module 230 extracts information regarding the second content stored in the content storage module 240 based on the broadcast channel that broadcasts the first content and the transmission time of the service request message (operation S340) and transmits the extracted second content to the display apparatus 130 via the communication module 200 (operation S350). In this case, the second content is associated with the first content, and the second content information displayed on the display apparatus 130 may vary according to the service request message.

That is, the content storage module 240 updates the second content information based on the analysis of the service request message.

If the second content is transmitted to the display apparatus 130 via the communication module 200 (operation S350), the display apparatus 130 displays the second content (operation S360). The second content may be displayed differently according to display information of the display apparatus 130, which will be described in detail with reference to FIG. 5.

Figure 5:
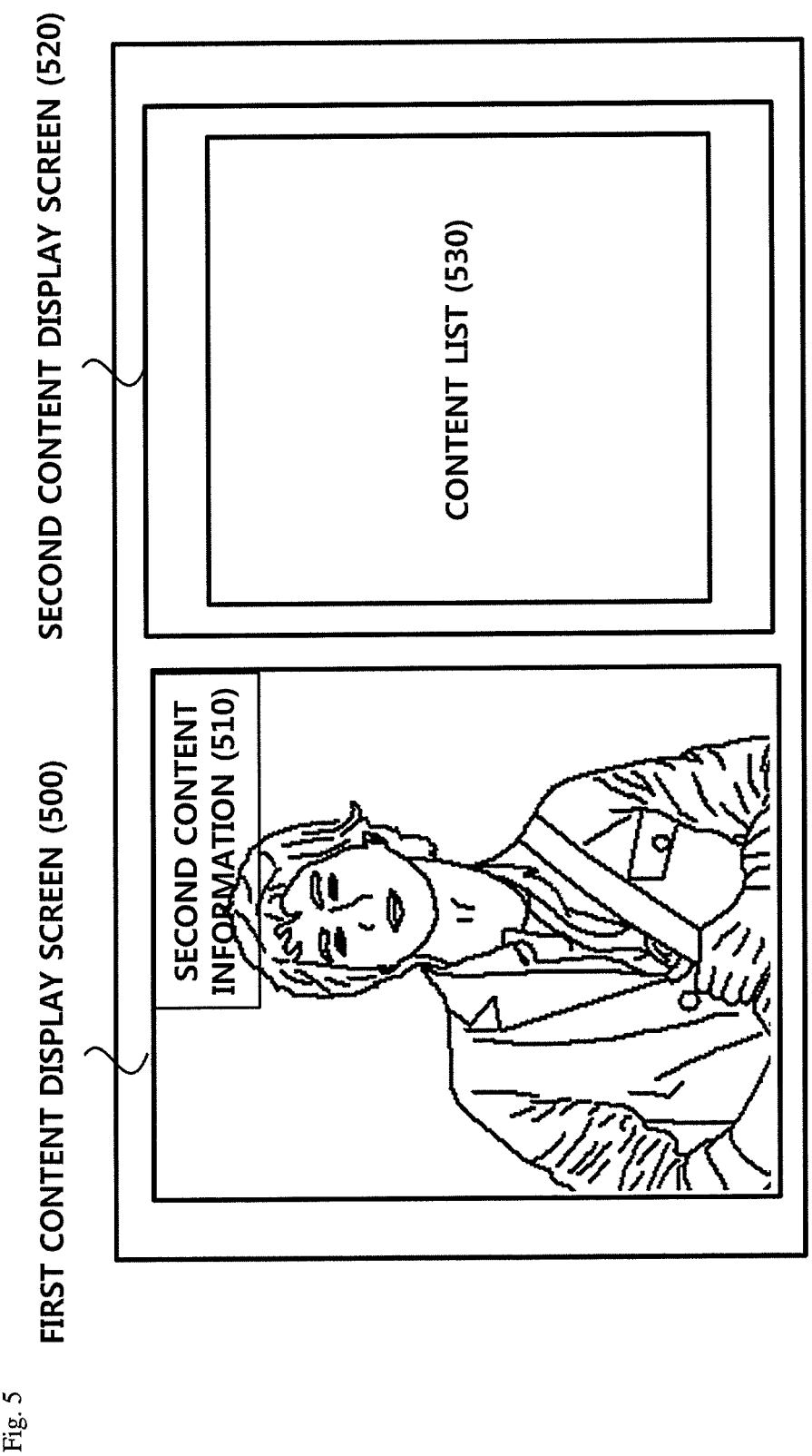
FIG. 5 shows a display screen according to an exemplary embodiment of the present invention.

FIG. 5 shows a display screen according to an exemplary embodiment of the present invention.

Referring to FIG. 5, the display screen according to the present exemplary embodiment may be divided into a first content display screen 500 and a second content display screen 520 according to a display method set by the user 140.

The screen displayed on the display apparatus 130 may vary according to the setting of the user 140. Therefore, the present invention is not limited to the above display method, which may, however, be desirable.

The first content display screen 500 displays broadcast content generally provided by a headend and second content information 510 associated with first content.

The second content information 510 indicates whether second content associated with the first content displayed on the display apparatus 130 exists and may include information regarding the number of pieces of the second content associated with the first content.

That is, the user 140 determines whether the second content exists based on the second content information 510 and transmits a service request message for the second content to the content provision apparatus 100 based on the determination result.

Then, the content provision apparatus 100, which receives the service request message, provides the second content to the display apparatus 130 using a method identical or similar to the method described above with reference to FIG. 2.

The second content provided to the display apparatus 130 is displayed on the second content display screen 520. In this case, at least a piece or a list of a plurality of pieces of the second content may be displayed. If the list of the pieces of the second content is displayed, the display apparatus 130 may retransmit a service request message for the second content to the content provision apparatus 100 at the choice of the user 140. Therefore, the second content can be provided using a method similar or identical to the method of providing a content list.

In addition, the display of the first content may be limited by the second content displayed on the second content display screen 520.

Using the above content display method according to the present exemplary embodiment, second content desired by each user can be displayed for each user.

Figure 6:
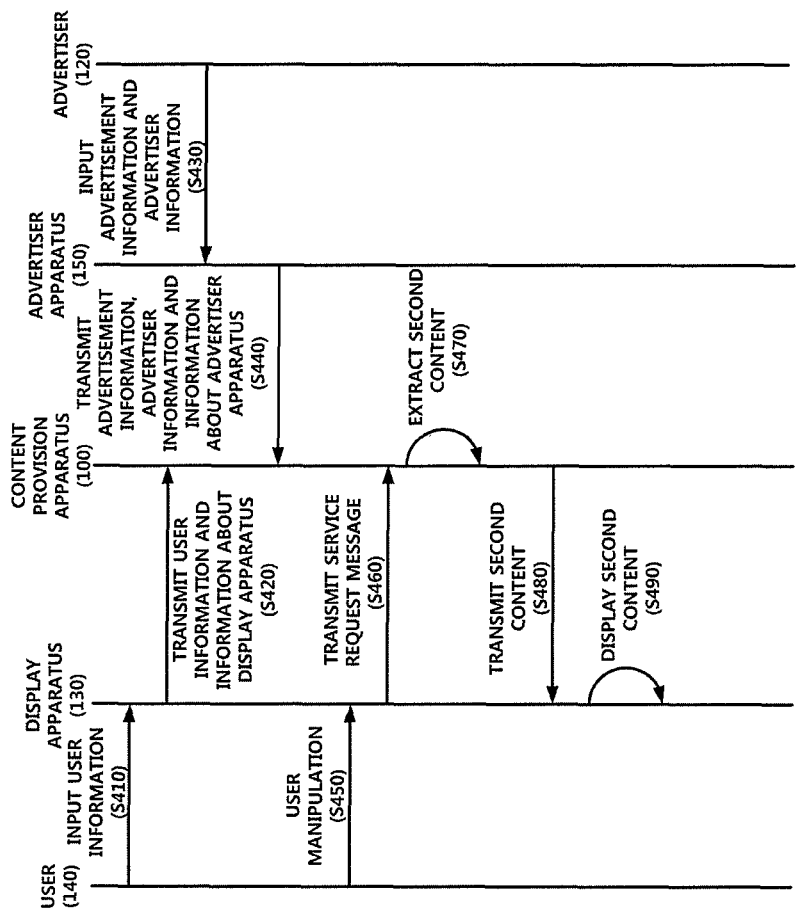
FIG. 6 is a flowchart illustrating the operation flow of the content provision system shown in FIG. 1.

FIG. 6 is a flowchart illustrating the operation flow of the content provision system shown in FIG. 1. Referring to FIG. 6, in the content provision system according to the present exemplary embodiment, the user 140 inputs user information to the display apparatus 130 (operation S410), and the display apparatus 130 transmits the user information and information about itself to the content provision apparatus 100 (operation S420). Accordingly, the content provision apparatus 100 stores the user information and the information about the display apparatus 130.

In addition, the advertiser 120 inputs advertiser information and advertisement information to an advertiser apparatus 150 (operation S430), and the advertiser apparatus 150 transmits the advertiser information, the advertisement information and information about itself to the content provision apparatus 100 (operation S440). Accordingly, the content provision apparatus 100 stores the advertiser information, the advertisement information, and the information about the advertiser apparatus 150.

If the user 140 makes an action such as changing broadcast channels of the display apparatus 130 or selecting second content information presented in the OSD format (operation S450), the display apparatus 130 transmits a service request message to the content provision apparatus (operation S460). Accordingly, the content provision apparatus 100 analyzes the received service request message and extracts second content associated with first content that the user 140 is viewing (operation S470). Then, the content provision apparatus 100 transmits the extracted second content to the display apparatus 130 (operation S480), and the display apparatus 130 displays the received second content (operation S490).

While exemplary embodiments of the present invention have been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in exemplary embodiments of the present invention.

The invention claimed is:

1. A content provision apparatus comprising:
a message reception module configured to selectively receive an advertising content request message, the advertising content request message comprising a transmission time of the advertising content request message and information corresponding to a broadcast channel of broadcasting content, the advertising content request message being received from a display apparatus which is displaying the broadcast content;
a content extraction module configured to extract advertising content associated with the broadcast content based on the broadcast channel corresponding to the information included in the advertising content request message and the transmission time of the advertising content request message; and
a communication module configured to transmit the extracted advertising content,
wherein the advertising content is directly uploaded to the content provision apparatus by an advertiser of the advertising content, and the advertising content is associated with the broadcast content selected by the advertiser, and
wherein in the requesting of the advertising content associated with the broadcast content, the advertising content associated with the broadcast content is selectively requested during playback of the broadcast content.

2. The apparatus of claim 1, wherein the advertising content request message further comprises at least one of user information of a user, who is viewing the broadcast content, and information about the display apparatus.

3. The apparatus of claim 2, wherein the user information comprises at least one of a contact number and an address of the user.

4. The apparatus of claim 2, wherein the information about the display apparatus comprises at least one of a serial number and an Internet Protocol (IP) address of the display apparatus.

5. The apparatus of claim 1, wherein the display apparatus comprises:
a user input module which receives the user information inputted by a user;
a detection module which detects whether the user manipulates the display apparatus;
a message transmission module which transmits the advertising content request message based on a detection result of the detection module;
a content reception module which receives the advertising content which is transmitted from the content provision apparatus in response to the advertising content request message; and
a display module which displays the received advertising content.

6. The apparatus of claim 5, wherein the detection module detects a change of broadcast channels of the display apparatus by the user or a selection of advertising content information, which is displayed on the broadcast content in an on-screen display (OSD) format, by the user.

7. The apparatus of claim 6, wherein the message transmission module transmits the advertising content request message if the detection module detects the user manipulating the display apparatus.

8. The apparatus of claim 5, wherein the display module displays the broadcast content and the advertising content in different regions of the display module.

9. The apparatus of claim 1, further comprising a content storage module which stores the advertising content.

10. A content provision method comprising:
receiving advertising content which is directly uploaded by an advertiser of the advertising content;
associating the advertising content with broadcast content selected by the advertiser;
selectively receiving an advertising content request message, the advertising content request message comprising information corresponding to a broadcast channel of the broadcast content and a transmission time of the advertising content request message, the advertising content request message being received from a display apparatus which is displaying the broadcast content;
extracting the advertising content based on the broadcast channel corresponding to the information included in the advertising content request message and the transmission time of the advertising content request message; and
transmitting the extracted advertising content to the display apparatus,
wherein the advertising content request message is selectively requested during playback of the broadcast content.

11. The method of claim 10, wherein the advertising content request message further comprising at least one of user information of a user, who is viewing the broadcast content, and information about the display apparatus.

12. The method of claim 11, wherein the user information comprises at least one of a contact number and an address of the user.

13. The method of claim 11, wherein the information about the display apparatus comprises at least one of a serial number and an IP address of the display apparatus.

14. The method of claim 10, the method further comprising:
the user inputting by the user, user information through the display apparatus;
detecting a user's manipulation of the display apparatus by the display apparatus;

transmitting by the display apparatus, the service request message based on a detection result;

receiving by the display apparatus, the advertising content, which is provided in response to the advertising content request message; and displaying the received advertising content.

15. The method of claim 14, wherein the detecting of the user's manipulation of the display apparatus comprises detecting a change of broadcast channels of the display apparatus by the user or selection of advertising content information, which is displayed on the broadcast content in an onscreen display (OSD) format, by the user.

16. The method of claim 15, wherein the transmitting of the advertising content request message comprises transmitting the advertising content request message if the user's manipulation of the display apparatus is detected.

17. The method of claim 14, wherein the displaying of the received advertising content comprises displaying the broadcast content and the advertising content in different regions of the display apparatus.

18. The method of claim 10, further comprising pre-storing the advertising content.

19. A method of providing advertisement content, the method comprising:

displaying a broadcast content on a broadcast channel on a display apparatus;

selectively transmitting an advertisement request message a display apparatus which is displaying the broadcast content, the advertising content request message comprising information corresponding to the broadcast channel and a transmission time of the advertising content request message;

receiving advertisement content extracted by the content supplying apparatus based on the broadcast channel corresponding to the information included in the advertising content request message and the transmission time of the advertisement request message; and displaying the broadcast event with the received advertisement content, wherein the transmitting the advertisement request message comprises transmitting the advertisement request message based on a viewer selection of the advertisement content or automatically transmitting the advertisement request message based on a viewer manipulation of the display apparatus, wherein the advertisement content is directly uploaded to the content provision apparatus by an advertiser of the advertisement content, and the advertisement content is associated with broadcast content selected by the advertiser, and wherein the advertising request message is selectively requested during playback of the broadcast content.

20. The method of claim 19, wherein the advertisement is pre-associated with the broadcast content by using keywords of the broadcast content.

21. The method of claim 19, wherein the advertisement is pre-associated with the broadcast content by using electronic programming guide information.

22. The method of claim 19, wherein the advertisement is pre-associated with the information about the viewer of the display apparatus.

23. The method of claim 19, wherein the viewer manipulation of the display apparatus comprises the viewer performing a keyword search.

24. The method of claim 20, wherein an advertiser pre-associates the advertisement with the broadcast content by performing a keyword search.

25. The method of claim 20, wherein the keywords of the broadcast content comprise titles of the broadcast contents.

26. The method of claim 20, wherein the keywords of the broadcast content comprise broadcast times of the broadcast contents.

27. The method of claim 20, wherein the keywords of the broadcast content comprise genres of the broadcast contents.

28. The method of claim 20, wherein the keywords of the broadcast content comprise characters in the broadcast contents.

29. The method of claim 20, wherein the keywords of the broadcast content comprise cast members in the broadcast contents.

30. The method of claim 20, wherein the keywords of the broadcast content comprise directors of the broadcast contents.

31. The method of claim 20, wherein the keywords of the broadcast content comprise creators of the broadcast contents.

32. The method of claim 20, wherein the keywords of the broadcast content comprise writers of the broadcast contents.

33. The method of claim 20, wherein the keywords of the broadcast contents comprise crew members of the broadcast contents.

34. The method of claim 20, wherein the keywords of the broadcast content comprise parental guidance ratings of the broadcast contents.

35. The method of claim 20, wherein the keywords of the broadcast content comprise critic ratings of the broadcast contents.

36. The method of claim 20, wherein the keywords of the broadcast content comprise viewer ratings of the broadcast contents.

37. The method of claim 20, wherein the keywords of the broadcast content parental guidance reviews of the broadcast contents.

38. The method of claim 20, wherein the keywords of the broadcast content comprise critical reviews of the broadcast contents.

39. The method of claim 20, wherein the keywords of the broadcast content comprise viewer reviews of the broadcast contents.

40. The method of claim 20, wherein the keywords of the broadcast content comprise award nominations or awards won of the broadcast contents.

41. The method of claim 20, wherein the keywords of the broadcast content comprise target demographics of the broadcast contents.

42. The method of claim 20, wherein the keywords of the broadcast content comprise analyzed preferences of the viewer.

43. The method of claim 20, wherein the keywords of the broadcast contents comprise descriptions of the broadcast contents.

* * * * *